Oct. 29, 1929.  A. SCHEUERMANN  1,733,907
DRAINER AND DEPOSITORY FOR DISHES
Filed March 17, 1928
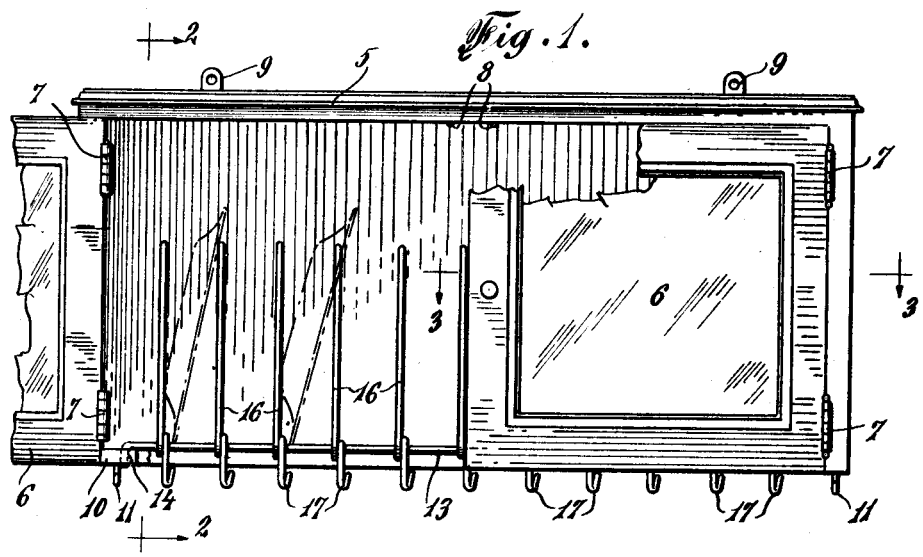
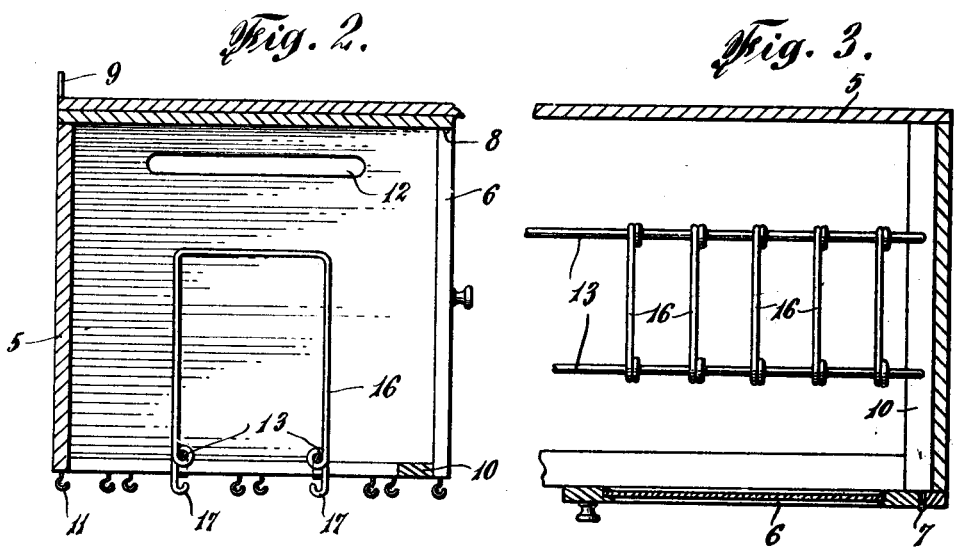
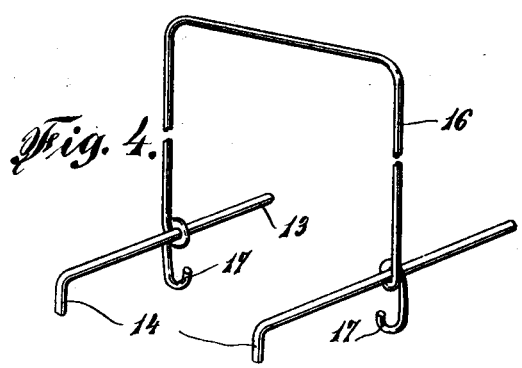
INVENTOR
A. Scheuermann
BY
John O. Seifert
ATTORNEY Patented Oct. 29, 1929

1,733,907

UNITED STATES PATENT OFFICE

ANGIOLINA SCHEUERMANN, OF TUCKAHOE, NEW YORK

DRAINER AND DEPOSITORY FOR DISHES

Application filed March 17, 1928. Serial No. 262,382.

This invention relates to a drainer and depository for dishes in which dishes as they are washed are placed to drain and dry and then enclosed therein until they are again required to be used, and it is the object of the invention to provide an article for this purpose which is simple and cheap in structure, novel and efficient in use.

In carrying out this invention I provide a cabinet having an open bottom and front and the front preferably arranged with releasable closure means, said cabinet being arranged with means to suspend it in an elevated position above a sink, and having a rack therein to support dishes in edgewise spaced relation, and said rack as well as the cabinet may be provided with means to suspend utensiles or dishes, such as cups, therefrom, the rack preferably being removably mounted in the cabinet for cleaning the same.

In the drawing accompanying and forming a part of this application, Figure 1 is an elevational view of a cabinet partly open showing a rack for dishes mounted therein.

Figure 2 is a cross sectional view taken on line 2—2 of Figure 1, looking in the direction of the arrows.

Figure 3 is a fragmentary cross sectional view of the cabinet taken on line 3—3 of Figure 1 looking in the direction of the arrows to show the mounting of the rack therein; and Figure 4 is a perspective view of one end of the rack.

In carrying out the invention there is provided a cabinet 5 of rectangular shape arranged with an open bottom and an open front provided with closure means, shown as comprising a pair of doors 6 hingedly mounted on the front vertical edges of the side members of the cabinet, as at 7, and adapted to be releasably held in closed position by spring influenced detents 8 mounted in and projecting from the top of the cabinet to engage correspondingly shaped recesses in the top edges of the closures. To mount the cabinet on a wall above a sink, not shown in the drawing, perforated cleats 9 are fixed to the back of the cabinet to project from the top thereof for engagement of supporting means, such as hooks fixed in the wall, not shown. The bottom of the cabinet is re-enforced and held rigid by a frame 10 adapted to serve as an abutment for the bottom of the closures 6, and as a mounting means for hooks 11 for suspending utensils such as cups. To permit of a circulation of air through the cabinet to facilitate drying the dishes within the cabinet the end members of the cabinet are perforated adjacent the top, as at 12, said perforations acting as outlets and the open bottom as the inlet for the air.

To support dishes, particularly plates and platters as shown in dotted lines, in the cabinet and permit draining thereof a rack is removably mounted within the cabinet to extend longitudinally thereof and comprising a pair of parallel bars 13 having the ends 14 bent laterally and adapted to be removably engaged in spaced perforations in the end members of the frame 10, as shown at 15 in Figure 1. U-shaped members 16 as of wire are fixed at the ends to the parallel bars in spaced relation to project above the same and into the cabinet to support dishes engaged upon the bars in edgewise relation so that they may readily drain through the bottom of the cabinet and dry by the circulation of the air through the cabinet. The U-shaped members are fixed to the bars by twisting a coil of the free ends of the wire about the bars with the ends extending oppositely to the U-shaped portion from the bars and shaped to form hooks 17 and when the rack is mounted in the cabinet the hooks extend below the bars for the ready engaging and suspending of utensils, such as cups, therefrom for the purpose specified.

It will be obvious that modifications may be made in construction and arrangement of parts, and that portions of the invention may be used without others, without departing from the scope of the invention.

Having thus described my invention I claim:

A drainer and depository for dishes embodying a cabinet arranged with an open front and bottom, and a dish carrying rack mounted in the cabinet comprising parallel bars and a series of U-shaped members mounted on the bars in spaced relation to each other to extend above the bars and into the cabinet to support dishes in vertical edgewise relation on the bars engaged on the bars between said members, said members having hook portions extending below the bars for the suspending of utensils.

Signed at the city of New York, in the county of New York and State of New York, this 14th day of March, 1928.

ANGIOLINA SCHEUERMANN.